Patented Dec. 5, 1944

2,364,430

UNITED STATES PATENT OFFICE 2,364,430

ALKYLATION PROCESS EMPLOYING HYDROGEN

Carleton Ellis, Montclair, N. J., assignor to Standard Oil Development Company, a corporation of Delaware No Drawing. Application July 16, 1940,
Serial No. 345,855

8 Claims. (Cl. 260—683.4)

This invention relates to alkylation or polymerization reactions in which a hydrocarbon group is treated in a manner similar to the treatment of hydrogen in hydrogenation operations.

In the Ellis U. S. Patent No. 1,464,152 of 1923 the use of sulfuric acid as an alkylating and polymerizing agent is considered. This was later followed by the issuance of a patent in Great Britain to Dunstan et al., being British Patent No. 479,345 of 1938, which uses a similar agent.

It appears that the sulphates produced by the more rapid action of sulfuric acid on olefins tend to cause a repression or retardation of alkylation, and also since sulfuric acid used repeatedly as an activating agent is troublesome, due to its agglutinating effect on the stock, the present invention has for its object the elimination of sulfuric acid and similar activating substances.

According to the present invention, I may use ordinary hydrogenating action, as, for example, a mixture of isobutane and an olefin, preferably with the isobutane in excess, and the olefin being preferably butene. These substances, admixed with hydrogen, may be reacted in the presence of a hydrogenating or dehydrogenating solid catalyst mass, the iso- or tertiary hydrocarbon becoming activated in the operation and interacting with the olefin to form an alkylated arrangement of a carbon content, molecularly speaking, corresponding more or less to the form of the carbons present in the reacting mixture. That is, from such a mixture of isobutane and butene there may be obtained, by a coupling of these substances, an iso-octane or branchy octane which is highly suitable as a high grade motor fuel.

The hydrogen which is incorporated in the reaction mixture, preferably in amounts less than that of either the paraffin or olefin hydrocarbon, is employed not to secure complete saturation of the olefinic bodies present, but rather to act as a regulating agent and substantially to inhibit any tendency toward excess accumulation of unsaturated hydrocarbons in the reactants or reaction products. This will be seen to be particularly suitable for the purpose of my invention, since under these conditions the tendency for interaction of olefin with olefin is suppressed, and alkylation or reaction of the saturated hydrocarbon with the olefin is enhanced.

I seek therefore to activate the mixture and bring about such reaction, thus avoiding the objection regarding use of sulfuric acid as well as any retarding action due to the formation of hydrocarbon sulfates, etc.

The reaction may be carried out with cracking by coil and soaker, coil only, or in any other suitable manner.

It has been noted by Frey and Hepp in Industrial and Engineering Chemistry, December, 1936, particularly the second column and the second paragraph on page 1443, that the union of olefins with olefins will take place readily under high pressures, without any catalytic material being present. In hydrogenation it is customary to use a catalytic material, and since nickel, the commonly used catalyst for fatty oil hydrogenation, is undesirable in petroleum operations of a similar character because of the affinity of nickel for sulfur, which acts as a poison for the catalyst, I prefer to react the olefin with the activated hydrocarbon to form the alkylated material of the present invention by the use of those contact agents which are resistant to sulfur, as, for example, oxides, sulfides, oxysulfides, selenides, or tellurides of chromium, molybdenum, tungsten, cobalt, cadmium, iron, zinc, manganese, and the like. These catalysts may be employed singly or in any combination suitable to the particular reactants, temperature, pressure or other conditions of reaction. The catalytic masses preferably are employed in the solid state and may be placed, if desired, on a supporting or carrier medium such as oxides of magnesium or aluminum, or any suitable support.

The pressure involved (and it may be observed here that I prefer to use a fairly high pressure) may range from ordinary pressures up to several hundred atmospheres. As to temperatures, preferably that range between 200° and 500° C. is desirable. Temperatures above 500° C. are not recommended.

When a mixture of hydrocarbons is used, some of which are of the aromatic type, it is likely that some of the activated hydrocarbon will combine with the aromatic compound.

If a catalyst is used, the hydrocarbon saturate may be treated as though it were hydrogen itself, and normal hydrocarbons, as well as those having a tertiary hydrocarbon group, may be used when desired.

My invention may be illustrated in the following manner:

Example 1

Pass a gaseous mixture comprising 95 mol per cent of isobutane, 3 mol per cent of butylene and 2 mol per cent of hydrogen over a hydrogenation catalyst consisting of molybdenum sulfide. The temperature of the reaction zone (and catalyst) is kept at 400° C. and the gases are maintained under a pressure of 200 atmospheres. Passage of the reaction mixture can be regulated so that the time of contact is about 3 minutes. Afterwards conduct the reaction mixture through a condensing apparatus whereby the products which are normally liquids are separated from the normally gaseous hydrocarbons. The latter then may be fortified by addition of isobutane and/or butylene, as the case may be, and circulated again through the heated reaction zone. The liquid products are subjected to fractional distillation, and the entire portion boiling below 300° F. separated as an aviation gasoline having a high anti-knock value.

*Example 2*

The ethylene fraction containing both ethane and ethylene and secured by the fractional distillation of cracking gas (after washing the latter with aqueous sodium hydroxide to eliminate hydrogen sulfide) is admixed with isobutane, the mol per cent ratio in this instance being 95 of isobutane and 5 of the ethylene fraction. To this mixture add 1 mol per cent of hydrogen. Conduct the resulting gaseous admixture repeatedly over a catalyst of tungsten and molybdenum oxides maintained at a temperature of 450° C. The pressure on the gases is kept at 250 atmospheres. When the time of contact has reached 5 minutes, pass the reaction mixture through a condensing apparatus and separate normally liquid products from the normally gaseous hydrocarbons. The latter may be reused after addition thereto of olefin or paraffin hydrocarbons (i. e., ethylene fraction or isobutane) as may be required. The liquid products may be distilled and the liquid portion boiling below 300° F., consisting mainly of iso-paraffins, employed as a high grade motor fuel.

*Example 3*

Pass a gaseous mixture consisting of 93 mol per cent of isobutane, 4 mol per cent of butylene and 3 mol per cent of hydrogen over a hydrogenating catalyst made of the oxysulfides of molybdenum and chromium. Maintain the pressure at 150 atmospheres and the reaction temperature at 350° C. After the time of contact amounts to 2 minutes, conduct the reaction mixture through a condenser whereby separation of normally liquid and gaseous hydrocarbons is effected. The liquid products consisting mainly of isoparaffins can be distilled and suitable fractions or cuts thereby secured.

It will be seen that my invention comprises subjecting a mixture of paraffin and olefin hydrocarbons together with a small proportion of hydrogen to the action of a solid hydrogenating catalyst or catalytic mass, the temperature during reaction not exceeding 500° C. and the pressure being greater than atmosheric. The addition of a small quantity of hydrogen to the gaseous reaction mixture is particularly advantageous. The proportion of this gas, i. e., hydrogen, should be less than that of either the paraffin or the olefin hydrocarbon. Hydrogen is incorporated not to secure complete saturation of the olefinic bodies present but rather to act as a suppressing or regulatory agent to prevent an undue accumulation of unsaturated hydrocarbons. In this manner, I seek to avoid interaction of olefins with olefin and to enhance alkylation or reaction of olefin with paraffin. The proportion of paraffinic bodies is preferably considerably greater than that of the olefins. Under such conditions the products will be found to be mainly highly branched chain or isoparaffinic compounds.

Paraffin hydrocarbons suitable for my purpose include those which are normally gases, or, for example, ethane, propane, butane and pentane. More particularly applicable are those containing a branched structure such as isobutane or the isopentanes. Similarly, normally gaseous olefins are suitable, e. g., propylene, butylene or pentylene.

The isoparaffins secured as the products of reaction, according to this invention, may be used as such as a motor fuel, or they may be blended or admixed with other motor fuels to increase the octane or anti-knock value of the latter.

What I claim is:

1. A process which comprises subjecting a gaseous mixture consisting of a major proportion of a normally gaseous paraffin hydrocarbon and a minor proportion of a normally gaseous olefin hydrocarbon and a lesser proportion of molecular hydrogen than either proportion of the paraffin and olefin to the action of a solid dehydrogenating catalyst, said catalyst being essentially the only catalytic agent employed, at a temperature not less than 200° C. and not exceeding 500° C., and maintaining the pressure at greater than atmospheric during said operation.

2. The process according to claim 1 in which the paraffin hydrocarbon is isobutane and the olefin hydrocarbon is a butylene.

3. A process which comprises subjecting a mixture comprising essentially a paraffinic hydrocarbon and a monoolefinic hydrocarbon, the former being in substantial molar excess over the latter, in admixture with molecular hydrogen, said hydrogen being present in a substantially smaller amount than the amount of olefin employed, to the action of a solid hydrogenation-dehydrogenation catalyst, said catalyst being essentially the only catalytic agent employed, at a temperature between about 200° C. and about 500° C., under superatmospheric pressure.

4. A process which comprises subjecting a mixture of an isoparaffin and a normally gaseous monoolefin, the isoparaffin being in substantial molar excess over the monoolefin, in admixture with molecular hydrogen, the molar amount of said hydrogen being less than the molar amount of said monoolefin, to the action of a solid hydrogenation-dehydrogenation catalyst, said catalyst being essentially the only catalytic agent employed, at a temperature between about 200° C. and about 500° C., under superatmospheric pressure.

5. A process as in claim 4 wherein the isoparaffin is isobutane and the monoolefin is a $C_4$ monoolefin.

6. A process as in claim 4 wherein the isoparaffin is isobutane and the monoolefin is a $C_4$ monoolefin and wherein a normally liquid, branched chain paraffinic product boiling predominantly in the motor fuel range is recovered from the reaction mixture.

7. A process which comprises subjecting a mixture of about 93 mol per cent of isobutane, about 4 mol per cent of butylene, and about 3 mol per cent of molecular hydrogen, said hydrogen having been produced extraneous to the alkylation reaction and extraneous to the formation of the isobutane and butylene, to the action of a hydrogenation catalyst essentially made up of oxysulfides of molybdenum and chromium, said oxysulfides being essentially the only catalytic agent employed, under a pressure of about 150 atmospheres and at a temperature of about 350° C. for a period of about two minutes, and recovering the normally liquid, branched chain paraffinic product from the reacted mixture.

8. A process which comprises subjecting a mixture of about 95 mol per cent of isobutane, about 3 mol per cent of butylene, and about 2 mol per cent of molecular hydrogen, said hydrogen having been produced extraneous to the alkylation reaction and extraneous to the formation of isobutane and butylene, to the action of a hydrogenation catalyst consisting of molybdenum sulfide, said molybdenum sulfide being essentially the only catalytic agent employed, at a temperature of about 400° C., under a pressure of about 200 atmospheres, for a period of time of about three minutes, and recovering the normally liquid, branched chain paraffinic product from the reacted mixture.

CARLETON ELLIS.